(12) United States Patent
Kleinknecht

(10) Patent No.: US 10,344,886 B2
(45) Date of Patent: Jul. 9, 2019

(54) METHOD FOR OPERATING A REAGENT METERING VALVE AND APPARATUS FOR CARRYING OUT THE METHOD

(71) Applicant: ROBERT BOSCH GMBH, Stuttgart (DE)

(72) Inventor: Horst Kleinknecht, Fichtenburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/872,548

(22) Filed: Apr. 29, 2013

(65) Prior Publication Data

US 2013/0240040 A1 Sep. 19, 2013

Related U.S. Application Data

(63) Continuation of application No. 12/306,392, filed as application No. PCT/EP2007/059553 on Sep. 12, 2007, now abandoned.

(30) Foreign Application Priority Data

Sep. 20, 2006 (DE) .......................... 10 2006 044 080

(51) Int. Cl.
  *F01N 3/20* (2006.01)
  *F16K 31/06* (2006.01)
(52) U.S. Cl.
  CPC .......... *F16K 31/0675* (2013.01); *F01N 3/208* (2013.01); *F01N 2610/02* (2013.01);
  (Continued)
(58) Field of Classification Search
  CPC .. F16K 31/0675; F01N 3/208; F01N 2610/02; F01N 2900/1808; Y10T 137/0318; Y02T 10/24
  (Continued)

(56) References Cited

U.S. PATENT DOCUMENTS 1,761,122 A * 6/1930 Groff .......................... 239/533.6
4,359,032 A 11/1982 Ohie
(Continued)

FOREIGN PATENT DOCUMENTS

DE 34 26 799 1/1986
DE 37 10 467 12/1987
(Continued)

OTHER PUBLICATIONS

Theoretische und experimentelle Untersuchung zum Strahlausbreitungs- und Verdampfungsverhalten aktueller Diesel-Einspritzsysteme Von der Faultät für Energietechnik der Universität at Stuttgart zur Erlangung der Würde eines Doktor-Ingenieurs (Dr.-Ing.) genehmigte Abhandlung—Vorgelegt von Clause-Oliver-Schmalzing. Institut fur Thermische Stromungsmaschinen und Maschinenlaboratorium der Universitat Stuttgart.
(Continued)

*Primary Examiner* — Brandon D Lee
(74) *Attorney, Agent, or Firm* — Norton Rose Fulbright US LLP; Gerard Messina

(57) ABSTRACT

A method is proposed for operating a metering valve which is realized as a solenoid valve which is actuated by an electromagnet that interacts with an armature which is connected fixedly to a valve needle and, furthermore, is loaded with a pulse-width modulated metering signal which defines the metering of a reagent which is to be introduced into the exhaust-gas region of an internal combustion engine or of a preliminary stage of a reagent, as is an apparatus for carrying out the method. The opening duration of the metering valve is limited to a minimum opening duration, for which the metering valve is opened completely and which is fixed in such a way that a spray mist is always produced during the metering. The procedure according to this invention prevents the reagent from crystallizing and, as (Continued)

a result, firstly ensures exact metering of the reagent and secondly counteracts clogging of the metering valve, in particular if a urea/water solution is provided as preliminary stage of the reagent.

19 Claims, 2 Drawing Sheets

(52) U.S. Cl.
CPC ....... *F01N 2900/1808* (2013.01); *Y02T 10/24* (2013.01); *Y10T 137/0318* (2015.04)

(58) Field of Classification Search
USPC .................... 60/286, 274, 295; 251/129.05; 239/533.1–533.12, 585.2–585.5, 88–92
See application file for complete search history.

(56) References Cited

U.S. PATENT DOCUMENTS

| | | | |
|---|---|---|---|
| 4,566,416 A | 1/1986 | Berchtold | |
| 4,653,447 A | 3/1987 | Linder et al. | |
| 5,035,223 A * | 7/1991 | Watanabe | 123/459 |
| 5,224,462 A * | 7/1993 | Orzel | 123/696 |
| 5,431,893 A | 7/1995 | Hug et al. | |
| 5,522,218 A | 6/1996 | Lane et al. | |
| 5,592,921 A | 1/1997 | Rehbichler | |
| 5,605,042 A | 2/1997 | Stutzenberger | |
| 5,647,211 A | 7/1997 | Harber et al. | |
| 5,960,627 A | 10/1999 | Krampe et al. | |
| 6,432,373 B1 | 8/2002 | Tanazawa et al. | |
| 6,526,746 B1 | 3/2003 | Wu | |
| 6,766,788 B2 * | 7/2004 | Xu | 123/490 |
| 7,861,520 B2 | 1/2011 | Broderick et al. | |
| 7,866,144 B2 * | 1/2011 | Bakaj et al. | 60/286 |
| 2001/0048087 A1 | 12/2001 | Zimmermann et al. | |
| 2003/0109047 A1 | 6/2003 | Valentine | |
| 2003/0140621 A1 * | 7/2003 | Khair et al. | 60/286 |
| 2004/0040288 A1 | 3/2004 | Jacob et al. | |
| 2004/0093856 A1 | 5/2004 | Dingle et al. | |
| 2005/0210869 A1 * | 9/2005 | Rudelt et al. | 60/286 |
| 2005/0235632 A1 | 10/2005 | Tarabulski et al. | |
| 2006/0094566 A1 * | 5/2006 | Keeler et al. | 477/111 |
| 2006/0101810 A1 | 5/2006 | Angelo et al. | |
| 2006/0207243 A1 | 9/2006 | Roberts et al. | |
| 2006/0277898 A1 * | 12/2006 | McCarthy, Jr. | 60/286 |
| 2009/0199540 A1 | 8/2009 | Kleinknecht | |

FOREIGN PATENT DOCUMENTS

| | | |
|---|---|---|
| DE | 198 81 135 T1 | 11/1996 |
| DE | 196 35 507 | 3/1997 |
| DE | 196 36 507 A1 | 3/1997 |
| DE | 693 18 461 | 6/1998 |
| DE | 198 06 265 | 7/1999 |
| DE | 199 03 439 | 8/2000 |
| DE | 103 01 821 | 7/2004 |
| DE | 10 2005 022 562 | 12/2005 |
| EP | 0 840 430 | 5/1998 |
| EP | 0 849 443 | 6/1998 |
| EP | 0 558 452 | 6/1999 |
| EP | 1 024 254 | 8/2000 |
| EP | 1 291 498 | 3/2003 |
| EP | 1291498 | 3/2003 |
| EP | 1 672 191 | 6/2006 |
| EP | 2 066 883 | 7/2010 |
| JP | 2001-98930 | 4/2001 |
| WO | WO 2003/039737 A1 | 5/2003 |
| WO | WO 2007/142899 A2 | 12/2007 |

OTHER PUBLICATIONS

AdBlue—Very pure NO-reduction agent for Diesel engines equipped with SCR catalysts.

A Study of a New Aftertreatment System (2): Control of Urea Solution Spray for Urea-SCR.

* cited by examiner

METHOD FOR OPERATING A REAGENT METERING VALVE AND APPARATUS FOR CARRYING OUT THE METHOD

This application is a Continuation of U.S. Ser. No. 12/306,392, filed 23 Dec. 2008 which is a National Stage of PCT/EP2007/059533, filed 12 Sep. 2007 which claims benefit of Serial No. 10 2006 044 080.3, filed 20 Sep. 2006 in Germany and which applications are incorporated herein by reference. To the extent appropriate, a claim of priority is made to each of the above disclosed applications.

TECHNICAL FIELD

The invention is based on a procedure for operating a reagent metering valve, which is metering a reagent into the exhaust gas area of a combustion engine, and on a device for implementing the procedure according to the category of independent claims.

Subject of the present invention is also a computer program as well as a computer program product.

BACKGROUND

DE 199 03 439 A1 describes a procedure and device for operating a combustion engine, in whose exhaust gas area a SCR-catalyst (selective-catalytic-reduction) is arranged, which reduces the nitrous gases that are contained in the exhaust gas of the combustion engine with a reagent into nitrogen. The metering of the reagent or a preliminary stage of the reagent preferably takes place depending on parameters of the combustion engine, as for example the engine speed and the injected fuel quantity. Furthermore the metering preferably takes place depending on exhaust gas parameters, as for example the exhaust gas temperature or the operating temperature of the SCR-catalyst.

The reducing agent ammoniac, which can be won from a urea/water solution as a preliminary stage of the reagent, is for example provided as the reagent. The metering of the reagent or the preliminary stage has to be determined accurately. Too low metering causes nitrous gases in the catalyst not to be able to be completely reduced anymore. Too high metering causes a reagent slip, which can cause unnecessarily high reagent consumption on the one hand and depending on the consistency of the reagent an unpleasant odor nuisance on the other hand.

The determination of the reagent rate or the reagent dosage amount can take place according to EP 1 024 254 A2, based on an operating parameter of the combustion engine, as for example the fuel injection quantity and/or the engine speed and at least one parameter of the exhaust gas if necessary, as for example the exhaust gas temperature.

DE 196 36 507 A1 describes a procedure for controlling a combustion engine, at which at least one fuel after-injection is provided, which introduces oxidized exhaust components into the exhaust gas area of the combustion engine, which shall react exothermically in the exhaust gas area, in order to increase the exhaust gas temperature or at least to heat a component part. If only a small fuel amount shall be injected in the scope of the fuel after-injection, which cannot be shown anymore by the fuel injection valve, it is provided that only at each n-th fuel metering a fuel after-injection takes place.

DE 103 01 821 A1 describes a procedure for controlling an electromotor with a pulse-width modulated signal, which provides a default cycle duration and a certain duty cycle, which determines the performance or the engine speed of the engine. The cycle duration of the pulse-width modulated signal is modified depending on the duty cycle. Thereby it is ensured, that for each possible duty cycle the cycle duration is chosen in such a way that requirements regarding the power loss and requirements regarding the grid-bound failures are complied with.

EP 840 430 A1 describes a servo-drive, which is controlled by a three-phase pulse-width modulated signal. Provided are dead-times between the switch-on time and the switch-off time, whereby the dead times are variable, so that a modification of the switch-on time at a fixed cycle duration does not cause a corresponding modification of the switch-off time in all operating statuses. Thereby a more dissolved duty cycle can be achieved at a default cycle duration of the pulse-width modulated signal.

DE 37 10 467 A1 describes a fuel injection valve, which contains a core that is surrounded by an electromagnetic solenoid as well as a armature that interacts with the core and that is connected with a valve needle. When switching the electromagnet on it attracts the armature and enables thereby an opening for metering the fuel that is under pressure so long until the electromagnet is switched off.

DE 34 26 799 C2 describes a procedure for determining the opening point of time of a solenoid valve, from which on the solenoid valve is completely opened. The opening point of time is determined with the aid of the inductance change, which results from the attraction movement of the valve needle that is fixedly connected to the armature of the electromagnet, after switching on the electromagnet by changing the geometric proportions.

The invention is based on the task to provide a procedure for operating a metering valve, which is metering a reagent or a preliminary stage of a reagent into the exhaust gas area of a combustion engine, and a device for implementing the procedure, which enable a metering as exact as possible especially at lower dosage amounts or dosage rates.

SUMMARY

The approach of the invention with the characteristics of the independent claim provides the advantage that it is always ensured at each default dosage amount or dosage rate, which can be determined in a very big range, that a correct spray mist is produced. Thereby an exact metering of a reagent or the preliminary stage of the reagent is ensured, which a catalyst that is arranged in the exhaust gas area requires for converting the NOx that is in the exhaust gas either directly or after a conversion into a reagent that is directly applicable for the catalyst. By the approach of the invention a crystallizing of the reagent is especially avoided, which can cause a clogging of a metering valve, especially when the preliminary stage of the reagent is a urea/water solution.

Advantageous embodiments concern the consideration of parameters, depending on which the minimum opening duration of the metering valve is determined. The minimum opening duration can be determined depending on the pressure of the reagent and/or the exhaust gas temperature. Furthermore it can be provided that the minimum opening duration is determined depending on the operating voltage of the electromagnet of the metering valve. Moreover is can be additionally or alternatively provided that the minimum opening duration is determined depending on a measure for the exhaust gas temperature and/or a measure for the exhaust gas mass flow and/or a measure for the operating temperature of the metering valve and/or the reagent.

Another embodiment provides that the status, in which the metering valve is opened, is determined with the aid of an inductance-modification during the opening process of the metering valve that is actuated by an electromagnet. Thereby the minimum opening duration can be determined exactly. The inductance-modification can be simply determined from the measured current, which flows through the electromagnet.

The device according to the invention for implementing the procedure concerns initially a control unit, which is customized for implementing the procedure.

An extremely advantageous embodiment of the invention provides that a gasoline injection valve, which is known from the state of the art and which is very inexpensive due to the mass production, is used as the metering valve.

Another embodiment provides that for metering a urea/water solution is used as preliminary stage of the reagent.

The control unit preferably contains at least one electrical memory, in which the steps of the procedure are saved as a computer program.

The computer program according to the invention provides, that all steps of the procedure are carried out, when it runs on a computer.

The computer program product according to the invention with a program code, which is saved on a machine readable medium, carries out the procedure, when it runs on a computer or in the control unit.

BRIEF DESCRIPTION OF THE DRAWINGS

Further advantageous improvements and embodiments of the procedure according to the invention arise from further dependent claims. One embodiment of the invention is illustrated in the drawing and further explained in the following description.

DETAILED DESCRIPTION

Figure 1:
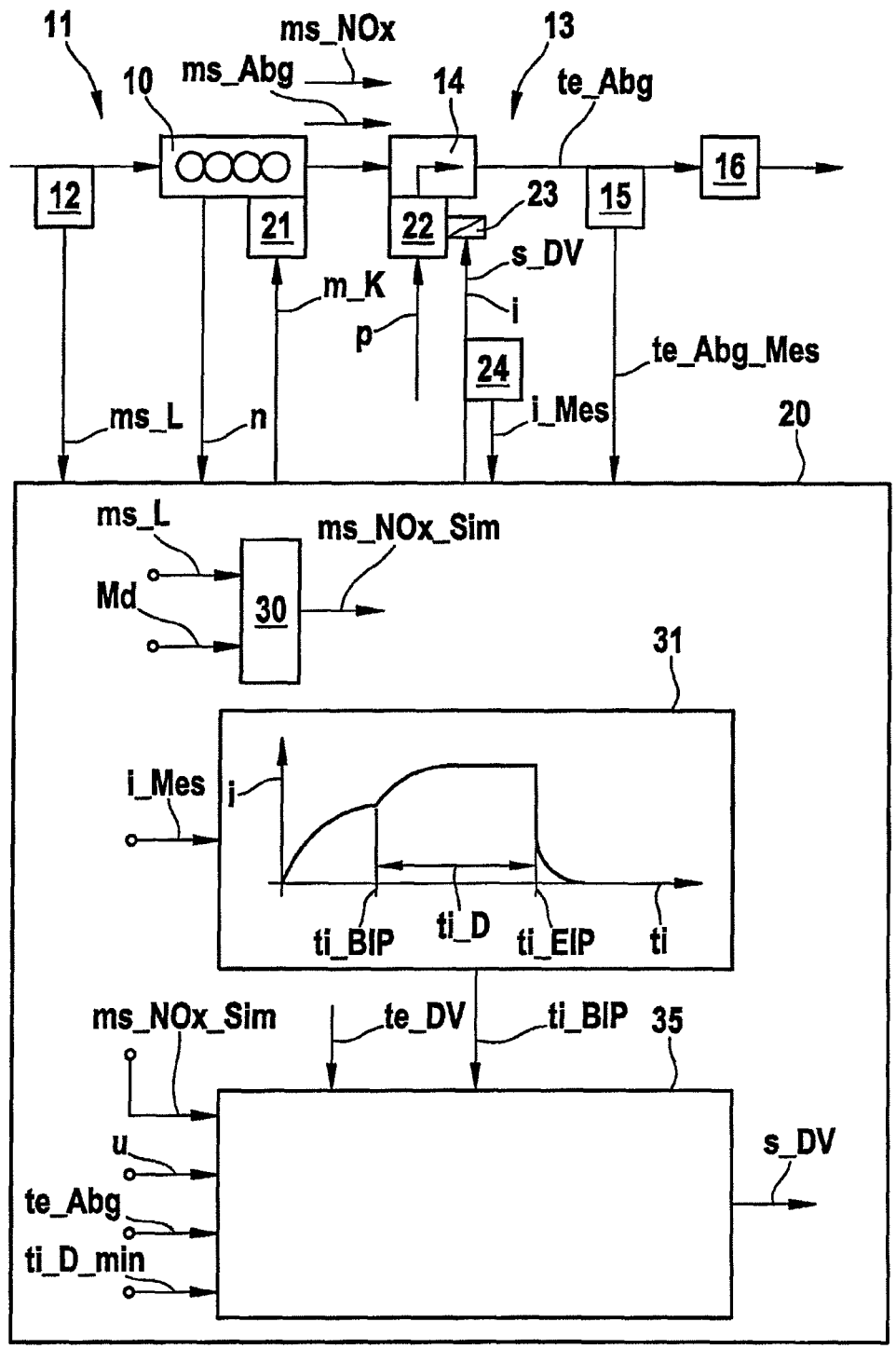
FIG. 1 is a technical environment, in which a procedure according to the invention is carried out.

FIG. 1 shows a combustion engine 10, in whose suction area 11 an air sensor 12 and in whose exhaust gas area 13, in which a NOx-mass flow ms_NOx, an exhaust gas mass flow ms_Abg and an exhaust gas temperature te_Abg occur, a metering device 14, an exhaust gas temperature sensor 15 as well as a catalyst 16 are arranged.

The air sensor 12 provides an air signal ms_l to a control unit 20, the combustion engine 10 an engine speed n and the exhaust gas temperature sensor 15 a measured exhaust gas temperature te_Abg_Mes. The control unit 20 supplies the fuel metering device 21 with a fuel signal m_K.

A metering valve 22 that is actuated by an electromagnet 23 is assigned to the metering device 14. The metering valve 22 is impinged with a metering signal s_DV, which is provided by the control unit 20 and which actuates the electromagnet 23. The current i that flows through the electromagnet 23 is detected by a current sensor 24 and supplied to the control unit 20 as measured current i_Mes. The reagent or the preliminary stage of the reagent that has to be metered provides an operating pressure p.

The control unit 20 contains a NOx-mass-flow-detection 30, which provides the air signal ms_L as well as a measure Md for the load of the combustion engine 10 and which provides a calculated NOx-mass flow ms_NOx_Sim.

The control unit 20 furthermore contains a valve needle position detection 31, which determines the metering valve opening point of time ti_BIP as well as the metering valve closing point of time ti_EIP for m the measured current i_Mes. A metering valve opening duration ti_D exists between the metering valve opening time ti_BIP and the metering valve closing point of time ti_EIP.

The valve needle position detection 31 provides the metering valve opening point of time ti_BIP to a metering signal determining 35. The metering signal determination 35 is then supplied with the calculated NOX-mass flow ms_NOx_Sim, the metering valve operating temperature te_DV, the electromagnet operating voltage u, the exhaust gas temperature te_Abg as well as a default minimum metering valve opening duration ti_D_min. By doing so the metering signal s_DV is determined.

Figure 2:
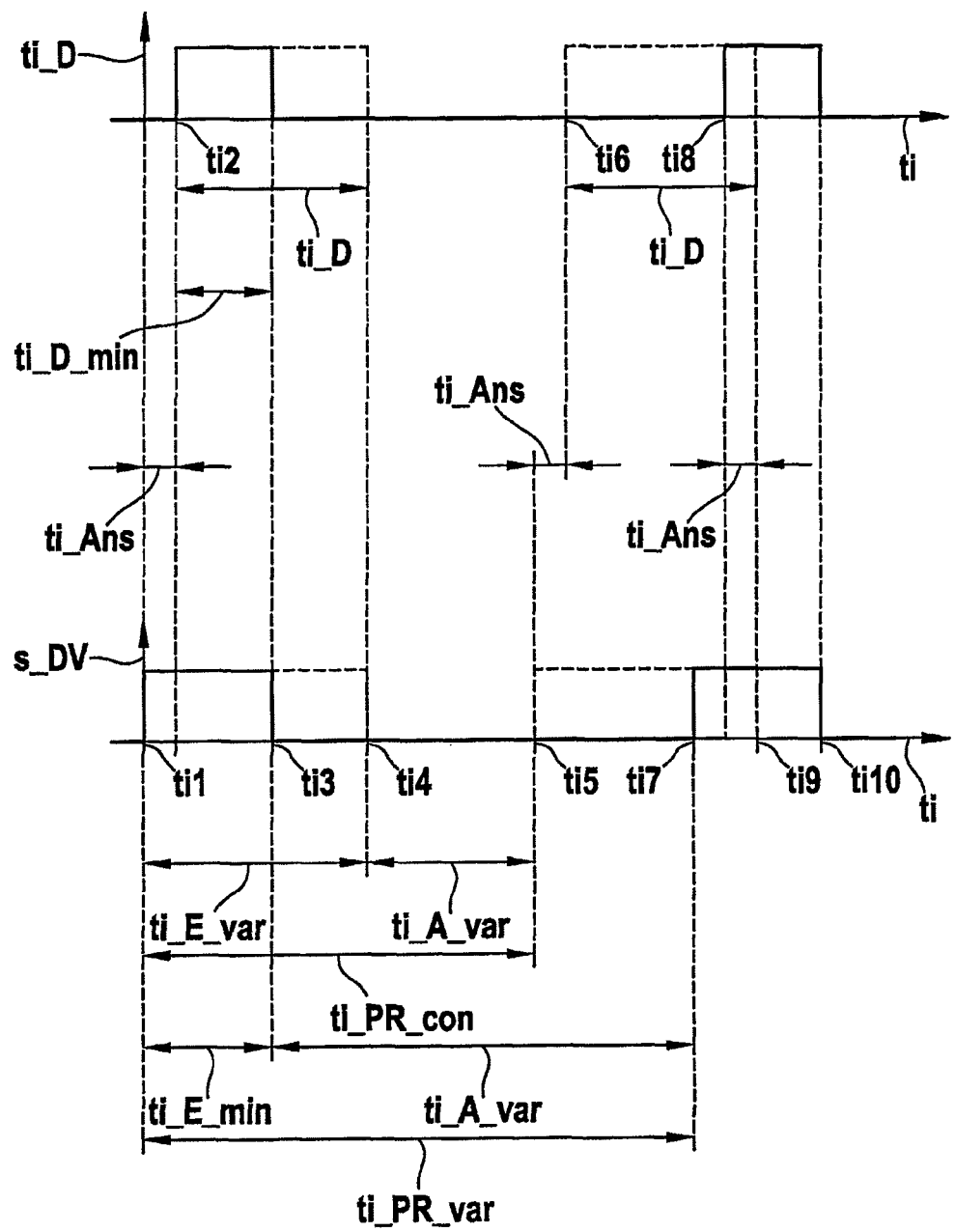
FIG. 2 is a metering valve-opening duration and a pulse-width modulated metering signal.

The metering signal determination 35 provides the metering signal s_DV as a pulse-width modulated signal, which is further explained in the scope of the following description of the functions with the aid of FIG. 2.

When operating the combustion engine 10 a NOx-mass flow ms_NOx can occur in the exhaust gas area 13, especially depending on the measure Md for the load of the combustion engine 10, which is not allowed to exceed a default measure due to statutory provisions. Equivalent to a NOx-mass flow ms_NOx is the integral of the NOx-mass flow ms_NOx, which reflects the NOx-mass related to the time or especially to a route, as long as the combustion engine 10 is used as drive motor in a motor vehicle.

The measure Md for the load of the combustion engine 10 can for example be won from a position of a not further shown accelerator pedal. The measure Md for the load of a combustion engine 10 is for example also reflected in the fuel signal m_K, which determines at least one fuel injection point of time during a cycle of the combustion engine 10 as well as the quantity of the fuel metering device 21 that has to be dosed. Ii is assumed in the shown embodiment that the NOx-mass flow ms_NOx of the NOx-mass-flow-determination 30 provides the calculated NOx-mass flow ms_NOx_Sim with the aid of the air signal ms_L that is supplied by the air sensor 12 and the measure Md for the load of the combustion engine 10.

The NOx that is contained in the exhaust gas shall be converted as much as possible in the catalyst 16. It is assumed in the shown embodiment that a SCR-catalyst is used as the catalyst 16, which requires the reagent or the preliminary stage of the reagent that has to be introduced into the exhaust gas area 13 with the metering device 14 of the reagent that efficiently works in the SCR-catalyst for carrying out the NOx-conversion.

It is assumed in the embodiment that a urea/water solution that is used as the preliminary stage of the reagent is directly sprayed into the exhaust gas area 13, whereby ammoniac is created there by a thermolysis, which the SCR catalyst 16 can use as a reagent.

The reagent can be spayed directly into the exhaust gas area 13 by the metering valve 22. In that case, the metering device 14 is identical to the metering valve 22 except, for example, an assembly flange. Alternatively, it can be provided that the metering device 14 contains a spraying pipe and that the metering valve 22 is not directly attached to an exhaust gas pipe or near to it.

The metering valve 22 is actuated by the electromagnet 23. A realization of the metering valve 22 that is as inexpensive as possible provides, that a usual gasoline injection valve that is very inexpensive due to its mass production is used as the metering valve 22.

A simple realization of the metering valve 22 provides, that being in switched-on state the electromagnet 23 attracts an armature, which is fixedly connected with a valve needle, which enables one or several openings in attracted state of the armature, from which the reagent that is under operating pressure p is sprayed out.

The electromagnet 23 is controlled with the pulse-width modulated metering signal s_DV, which is shown in the lower part of FIG. 2. A pulse-width modulated signal is provided, which initially supplies preferably a default cycle duration ti_PR_con, which begins at the first point of time ti1 and ends at the fifth point of time ti5. The variable switch-on duration ti_E_var, which lies between the first point of time ti1 and the fourth point of time ti4, determines the switch-on duration ti_E_var of the electromagnet 23. The variable switch-on duration ti_E_var begins again at the fifth point of time ti5 and ends at the ninth point of time ti9.

At least during a part of the switch-on duration ti_E_var the opening duration ti_D of the metering valve 22 occurs. In the subsequent switch-off duration ti_A_var, which lies between the forth point of time ti4 and the fifth point of time ti5, the electromagnet 23 is switched off and the metering valve 22 closed. The next opening duration ti_D occurs at the sixth point of time ti6 and ends at the ninth point of time ti9. It is assumed in the following that the switch-off point of time ti_EIP of the electromagnet 23 coincides at least approximately with the closing point of time of the metering valve 22.

In contrast to a usual gasoline injection the metering valve 22 in this approach that is preferably realized as a gasoline injection valve doses a significantly lower liquid quantity related to the time or the route. While a quantity of for example 5-15 liters/100 km is assumed at the gasoline injection, a consumption of for example almost 0 to 2 liters/1000 km can be assumed at a reagent metering.

The duty cycle of the pulse-width signal, which can be defined as switch-on duration ti_E_var/switch-off duration ti_A_var, varies thereby in a correspondingly wide range.

It has been proven by experiments that the reagent, for example the preliminary stage the urea/water solution, is not sprayed off as spray mist anymore below a certain opening duration ti_D of the metering valve 22. Instead driblets occur, which partially remain in the metering valve 22 or which get as an incomplete spray mist or especially driblets into the exhaust gas area 13.

Due to these driblets a loss of reagent occurs on the one hand and on the hand it was determined, that for example and urea/water solution is crystallized. The crystallization influences the geometric proportions at the metering valve 22 and can impair the ability for producing a spray mist. In the extreme case the crystallization can cause a clogging of the metering valve 22.

It has been proven by experiments that it can be ensured with a limitation of the opening duration ti_D of the metering valve 22 onto the minimum opening duration ti_D_min that at each metering process during the opening duration ti_D a correct spray mist is produced. By doing so the minimum opening duration ti_D_min has to be determined experimentally preferably depending on the valve type and/or on the conditions in the exhaust gas area 13. The default minimum opening duration ti_D_min is usually longer than the technically qualified minimum opening duration of the metering valve 22. The minimum opening duration ti_D_min is for example determined to 5 milliseconds, while the technically qualified minimum opening duration of a fuel injection valve, for example of a regular gasoline injection valve, can lie around 1 millisecond for example.

According to a simple embodiment the minimum default opening duration ti_D_min is equally determined with the minimum switch-on duration ti_D_min of the electromagnet 23. The metering valve cut-in time ti_ans lies between the beginning of the switch-on duration i_E_var of the electromagnet 23 at the first point of time ti1 and the complete opening of the metering valve at the second point of time ti2. Because the cut-in time ti_Ans can already have a significant percentage of the opening duration ti_D at the minimum default opening duration ti_D_min, the metering valve cut-in time ti_Ans is preferably considered. The approach for determining the cut-in time ti_Ans is known from the above stated state of the art according to DE 34 26 799 C2. The default minimum opening duration ti_D_min is counted in that case from the second point of time yi2 and ends at the third point of time ti3. The next default minimum opening duration ti_D_min begins at the eighth point of time ti8 and ends at the tenth point of time ti10.

By the default of the minimum opening duration ti_D_min the constant cycle duration ti_PR_con cannot be maintained anymore at a very low duty cycle, for example below 5%. In order to be able to adjust the duty cycle to lower values, it is therefore provided to arrange the cycle duration of the pulse-width modulated signal as a variable cycle duration ti_PR_var. by doing so the variable switch-of duration ti_A_var occurs then, which begins at the first point of time ti1 terminates at the seventh point of time ti1.

It has been proven by experiments that the production of spray mist depends on the operating pressure p of the reagent. According to an advantageous embodiment it is therefore provided to determine the minimum opening duration ti_D_min depending on the operating pressure p of the reagent, The operating voltage u, with which the electromagnet 23 of the metering valve 22 is operated, has influence on the cut-in time ti_Ans in relation to inner resistance of the electromagnet 23. According to an advantageous embodiment it is therefore provided that the operating voltage u is considered at the determination of the minimum opening duration ti_D_min.

Furthermore it has been proven with experiments that the production of spray mist depends on the exhaust gas mass flow ms_Abg, on the exhaust gas temperature te_Abg, on the exhaust gas pressure and on the operating temperature of the metering valve.

Advantageously the exhaust gas mass flow ms_Abg, the exhaust gas temperature te_Abg, the exhaust gas pressure and the operating temperature of the metering valve are therefore considered at the determination of the minimum opening duration ti_D_min.

The exhaust gas mass flow ms_Abg can be calculated by a not further shown exhaust gas ass flow determination with the aid of at least the air signal ms_L and if necessary the engine speed n and if necessary the measure Md for the load. The exhaust gas temperature te_Abg can also be at least approximately calculated from the air signal ms_L and the measure Md for the load of the combustion engine 10. In the shown embodiment the exhaust gas temperature sensor 15 provides the exhaust gas temperature te_Abg_Mes. The operating temperature of the metering valve 22 can be at least approximately calculated for example from the inner resistance of the electromagnet 23.

Therefore it is possible with these measures to consider the different influences on to the metering valve cut-in time ti_Ans, in order to specify the minimum opening time ti_D_min as correct as possible.

What is claimed is:

1. A method for operating a metering valve located in an exhaust-gas region downstream of a combustion chamber of an internal combustion engine, the metering valve being realized as a solenoid valve which is actuated by an electromagnet which interacts with an armature which is directly connected to a valve needle, the method comprising:
   energizing the electromagnet with a pulse-width modulated metering signal;
   controlling the metering valve located in the exhaust-gas region to meter a reagent or a precursor of a reagent into the exhaust-gas region of the internal combustion engine with the pulse-width modulated metering signal; and
   limiting an opening duration of the metering valve to a minimum opening duration, for which the metering valve is opened completely and which is fixed such that a correct spray mist is always produced during the metering;
   wherein no droplets are produced which partially remain on the metering valve;
   wherein the minimum opening duration is fixed such that the reagent or the precursor of the reagent would no longer spray as the correct spray mist below the minimum opening duration but instead would produce droplets which partially remain on the metering valve or would enter into the exhaust-gas region as an incomplete spray mist with the droplets;
   wherein the minimum opening duration begins when the metering valve is completely open after a metering valve cut-in time,
   wherein the step of limiting includes:
      determining a duty cycle of the pulse-width modulated metering signal to correspond to a ratio of a switch-on duration of the solenoid valve to a switch-off duration of the solenoid valve,
      determining the switch-on duration to be longer in time than and overlap with the minimum opening duration,
      determining a cycle duration of the pulse-width modulated metering signal to begin at a beginning of the switch-on duration and ends at an ending of the switch-off duration, and
      varying the cycle duration by varying the ending of the switch-off duration.

2. The method according to claim 1, further comprising determining the minimum opening duration based on an operating pressure of the reagent.

3. The method according to claim 1, further comprising determining the minimum opening duration based on an operating voltage of the electromagnet.

4. The method according to claim 1, further comprising determining the minimum opening duration based on at least one of:
   a measure for an exhaust gas temperature;
   a measure for an exhaust gas mass flow;
   a measure for an exhaust gas pressure; and
   a measure for an operating temperature of the metering valve and/or the reagent.

5. The method according to claim 1, further comprising determining a beginning of the opening duration at a specified time by an inductance-modification of the electromagnet.

6. The method according to claim 5, further comprising determining the inductance-modification by evaluating a current that flows through the electromagnet.

7. The method according to claim 1, further comprising determining the metering based on:
   an NOX-mass flow,
   a metering valve operating temperature,
   an operating voltage of the electromagnet,
   an exhaust gas temperature, and
   the minimum opening duration.

8. The method according to claim 7, further comprising determining the NOX-mass flow on the basis of an air signal provided by an air sensor and a measure for a load of the internal combustion engine.

9. A metering valve system comprising:
   a metering valve located in an exhaust-gas region downstream of a combustion chamber of an internal combustion engine, the metering valve being realized as a solenoid valve which is actuated by an electromagnet which interacts with an armature which is directly connected to a valve needle, the electromagnet adapted to be energized by a pulse-width modulated metering signal and thereby control the metering valve located in the exhaust-gas region to meter a reagent or a precursor of a reagent into the exhaust-gas region of the internal combustion engine; and
   means for implementing an opening duration of the metering valve and limiting the opening duration to a minimum opening duration, the metering valve being opened completely during the opening duration, and the opening duration fixed such that a correct spray mist is always produced during the metering;
   wherein no droplets are produced which partially remain on the metering valve;
   wherein the minimum opening duration is fixed such that the reagent or the precursor of the reagent would no longer spray as the correct spray mist below the minimum opening duration but instead would produce droplets which partially remain on the metering valve or would enter into the exhaust-gas region as an incomplete spray mist with the droplets; and
   wherein the minimum opening duration begins when the metering valve is completely open after a metering valve cut-in time, wherein the means for limiting includes:
      means for determining a duty cycle of the pulse-width modulated metering signal to correspond to a ratio of a switch-on duration of the solenoid valve to a switch-off duration of the solenoid valve,
      means for determining the switch-on duration to be longer in time than and overlap with the minimum opening duration,
      means for determining a cycle duration of the pulse-width modulated metering signal to begin at a beginning of the switch-on duration and ends at an ending of the switch-off duration, and
      means for varying the cycle duration by varying the ending of the switch-off duration.

10. The device of claim 9, wherein the metering valve is a fuel injection valve.

11. The device of claim 9, wherein the precursor of the reagent is a urea/water solution.

12. The device according to claim 9, further comprising means for determining the metering signal based on:
   an NOX-mass flow,
   a metering valve operating temperature,
   an operating voltage of the electromagnet,
   an exhaust gas temperature, and
   the minimum opening duration.

13. The device according to claim 12, further comprising means for determining the NOX-mass flow based on an air signal provided by an air sensor and a measure for a load of the internal combustion engine.

14. A computer-implemented method for operating a metering valve located in an exhaust-gas region downstream of a combustion chamber of an internal combustion engine, the metering valve being realized as a solenoid valve which is actuated by an electromagnet which interacts with an armature which is directly connected to a valve needle, the computer-implemented method comprising:
 energizing the electromagnet with a pulse-width modulated metering signal;
 controlling the metering valve located in the exhaust-gas region to meter a reagent or a precursor of a reagent into the exhaust-gas region of the internal combustion engine with the pulse-width modulated metering signal; and
 limiting an opening duration of the metering valve to a minimum opening duration, for which the metering valve is opened completely and which is fixed such that a correct spray mist is always produced during the metering;
 wherein no droplets are produced which partially remain on the metering valve;
 wherein the minimum opening duration is fixed such that the reagent or the precursor of the reagent would no longer spray as the correct spray mist below the minimum opening duration but instead would produce droplets which partially remain on the metering valve or would enter into the exhaust-gas region as an incomplete spray mist with the droplets; and
 wherein the minimum opening duration begins when the metering valve is completely open after a metering valve cut-in time, wherein the step of limiting includes:
  determining a duty cycle of the pulse-width modulated metering signal to correspond to a ratio of a switch-on duration of the solenoid valve to a switch-off duration of the solenoid valve,
  determining the switch-on duration to be longer in time than and overlap with the minimum opening duration,
  determining a cycle duration of the pulse-width modulated metering signal to begin at a beginning of the switch-on duration and ends at an ending of the switch-off duration, and
  varying the cycle duration by varying the ending of the switch-off duration.

15. The computer-implemented method according to claim 10, further comprising determining the metering signal based on:
 an NOX-mass flow,
 a metering valve operating temperature,
 an operating voltage of the electromagnet,
 an exhaust gas temperature, and
 the minimum opening duration.

16. The computer-implemented method according to claim 15, further comprising determining the NOX-mass flow based on an air signal provided by an air sensor and a measure for a load of the internal combustion engine.

17. A non-transitory computer-readable storage medium provided with computer-executable instructions stored thereon which, when executed by a computing system, cause the computing system to perform the instructions, the instructions including:
 a routine for energizing an electromagnet of a metering valve located in an exhaust-gas region downstream of a combustion chamber of an internal combustion engine, the electromagnet actuating a solenoid valve and interacting with an armature that is directly connected to a valve needle,
 wherein the electromagnet is energized with a pulse-width modulated metering signal which controls metering of a reagent or a precursor of a reagent into the exhaust-gas region of the internal combustion engine; and
 a routine for limiting an opening duration of the metering valve to a minimum opening duration, for which the metering valve is opened completely and which is fixed such that a correct spray mist is always produced during the metering;
 wherein no droplets are produced which partially remain on the metering valve;
 wherein the minimum opening duration is fixed such that the reagent or the precursor of the reagent would no longer spray as the correct spray mist below the minimum opening duration but instead would produce droplets which partially remain on the metering valve or would enter into the exhaust-gas region as an incomplete spray mist with the droplets; and
 wherein the minimum opening duration begins when the metering valve is completely open after a metering valve cut-in time, wherein the routine for limiting includes:
  a routine for determining a duty cycle of the pulse-width modulated metering signal to correspond to a ratio of a switch-on duration of the solenoid valve to a switch-off duration of the solenoid valve,
  a routine for determining the switch-on duration to be longer in time than and overlap with the minimum opening duration,
  a routine for determining a cycle duration of the pulse-width modulated metering signal to begin at a beginning of the switch-on duration and ends at an ending of the switch-off duration, and
  a routine for varying the cycle duration by varying the ending of the switch-off duration.

18. The non-transitory computer-readable storage medium according to claim 17, further comprising determining the metering signal based on:
 an NOX-mass flow,
 a metering valve operating temperature,
 an operating voltage of the electromagnet,
 an exhaust gas temperature, and
 the minimum opening duration.

19. The non-transitory computer-readable storage medium according to claim 18, further comprising determining the NOX-mass flow based on an air signal provided by an air sensor and a measure for a load of the internal combustion engine.

* * * * *